United States Patent [19]

Marzocchi et al.

[11] 4,273,685
[45] Jun. 16, 1981

[54] RUBBER MODIFIED ASPHALT COMPOSITIONS

[75] Inventors: Alfred Marzocchi; Michael G. Roberts; Charles E. Bolen; Edward R. Harrington, Jr., all of Newark, Ohio

[73] Assignee: Owens-Corning Fiberglas Corporation, Toledo, Ohio

[21] Appl. No.: 45,047

[22] Filed: Jun. 4, 1979

Related U.S. Application Data

[63] Continuation-in-part of Ser. No. 881,108, Feb. 24, 1978, abandoned.

[51] Int. Cl.³ .............................................. C08L 95/00
[52] U.S. Cl. ........................ 260/28.5 R; 427/389.8; 427/389.7; 428/392; 260/4 AR; 260/28.5 AS
[58] Field of Search ............... 260/28.5 AS, 4, 4 AR; 427/390 A, 385 A; 428/392

[56] References Cited

U.S. PATENT DOCUMENTS

| | | | |
|---|---|---|---|
| 2,888,407 | 5/1959 | Cooper et al. | 260/28.5 AS |
| 3,303,151 | 2/1967 | Peters et al. | 260/28.5 AS |
| 3,547,850 | 12/1970 | Montgomery | 260/28.5 |
| 3,992,340 | 11/1976 | Bonitz | 260/28.5 AS |
| 4,011,184 | 3/1977 | van Reijendam et al. | 260/28.5 AS |
| 4,154,710 | 3/1979 | Maldonado | 260/28.5 AS |
| 4,166,752 | 9/1979 | Marzocchi et al. | 106/273 N |
| 4,172,061 | 10/1979 | Bresson | 260/28.5 AS |
| 4,175,978 | 11/1979 | Marzocchi et al. | 106/281 R |

FOREIGN PATENT DOCUMENTS 51-53522   5/1976   Japan .

Primary Examiner—Melvyn I. Marquis
Attorney, Agent, or Firm—Ronald C. Hudgens; Robert F. Rywalski; Keith V. Rockey

[57] ABSTRACT

A rubber modified asphalt composition prepared by reacting a bituminous material with a polymerizable aromatic monomer and a rubbery polymer whereby the rubbery polymer is chemically integrated with the asphalt. The rubber modified asphalt compositions of this invention can be used in the treatment of glass fibers as well as in road paving applications, roofing applications and the like.

12 Claims, No Drawings

RUBBER MODIFIED ASPHALT COMPOSITIONS

This is a continuation-in-part of copending application Ser. No. 881,108, filed Feb. 24, 1978 and now abandoned.

This invention relates to rubber modified asphalt compositions, and more specifically to asphalt compositions which have been chemically modified to increase fire retardancy and chemical reactivity to promote compatibility between asphalt and reinforcements therefor.

As is well known to those skilled in the art, asphalt is a cementitious material containing predominantly bitumens which occur in nature as such, or are obtained as the residue in the refining of petroleum. It has been determined that chemically, asphalt is made up of condensed hydrocarbon rings; the condensed hydrocarbon rings, however, contain various reactive groups, notably carbon-to-carbon double bonds and tertiary hydrogen atoms. In terms of distribution, asphalt is much like a plastisol in that it is formed of graphitic particles suspended in a viscous liquid. The particles are of the same chemical type but differ from each other in molecular weight. Thus, the liquid phase of asphalt is formed predominantly of lower molecular weight condensed hydrocarbon rings, whereas the graphitic particles suspended therein are made up primarily of high molecular-weight condensed organic rings.

Asphalt has been used for many years in road paving applications as well as numerous other uses calling for strong, inert physical and chemical properties such as roofing and the like. An extensive field of use for asphalt now resides in road paving applications in which the asphalt is modified with fillers, and specifically glass fibers which are combined with asphalt or asphalt plus aggregate to increase the strength and wear resistance of road pavements. One of the difficulties, however, in combining glass, either in the form of glass fibers or in the form of fragments of glass, stems from the fact that glass is a highly hydrophilic material. Asphalt, on the other hand, since it is a petroleum derivative, is a highly hydrophobic material. Thus, there exists a basic incompatibility between glass fibers and asphalt by reason of their chemical nature. As a result, it has been difficult to establish any bond, either physical or chemical, between asphalt and glass, and notably glass fibers.

It is known, as described in U.S. Pat. No. 4,008,095, that asphalt can be modified by blending with it various materials including coal as well as natural and synthetic elastomers and petroleum resins. One of the difficulties with techniques of the sort that are described in that patent arise from the fact that the resulting blend of asphalt with an elastomeric or resinous modifying agent is not homogeneous, with the result that there is a tendency for the modifying agents to diffuse from the asphalt. Without limitation as to theory, it is believed that the reason for such migration arises from the fact that the modifying agents are not chemically bonded to the asphalt. As a result, it is difficult to obtain a homogeneous system by simply blending such materials with asphalt. That difficulty is compounded when it is desired to reinforce asphalt systems with fillers such as glass fibers since the glass fibers seem to promote diffusion of various components within the asphalt system.

It is accordingly an object of this invention to provide a chemically modified asphalt system which overcomes the disadvantages described above.

It is a more specific object of this invention to provide a modified asphalt wherein the asphalt molecules are chemically combined with elastomeric materials to thereby improve the performance characteristics of the asphalt and to afford reaction sites whereby the asphalt can be chemically bonded to reinforcements therefor, including glass fibers.

The concepts of this invention reside in a chemically modified asphalt composition wherein the asphalt is reacted with a polymerizable vinyl aromatic monomer and a rubbery polymer. Without limiting the invention as to theory, it is believed that the vinyl aromatic monomer is polymerizable with the ethylenic unsaturation of the asphalt itself and thereby serves to couple, by means of chemical bonds, the asphalt molecules with the rubbery polymer. The resulting chemically modified asphalt can thus be cross linked through the use of a suitable cross linking agent. In addition, the rubbery polymer chemically bonded to the asphalt can serve as a source of reaction sites to establish a chemical bond between the chemically modified asphalt and the reinforcing fillers, such as glass fibers, siliceous aggregate or combinations thereof blended with the chemically modified asphalt in reinforced asphalt systems.

In the preferred practice of the invention, use is made of a vinyl aromatic monomer having the general formula:

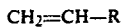

$$CH_2=CH-R$$

wherein R is an aromatic group such as a phenyl group, a substituted phenyl group wherein the substituent is any one of an amino group, a cyano group, a halogen group, a $C_1$-$C_3$ alkoxy group, a $C_1$-$C_3$ alkyl group, a hydroxy group, a nitro group, etc. R can also be a heterocyclic aromatic group such as a pyridyl group, a quinolyl group or the like. In general, R is an aromatic group containing 6 to 12 carbon atoms.

Preferred is styrene, although various other polymerizable vinyl aromatic monomers can be used. Included are p-aminostyrene, o-methoxystyrene, 2-vinyl pyridine, 3-vinyl quinoline, etc.

As the rubbery polymer, use can be made of a number of elastomeric materials well known to those skilled in the art. Included are natural rubbers as well as synthetic rubbers. Preferred are synthetic rubbers which are homopolymers of a conjugated diene (e.g., butadiene, isoprene, chloroprene, etc.) as well as various polymers which are substituted with a functional group containing a labile hydrogen atom. For example, various hydroxy, amino and like substituted homopolymers of conjugated dienes may likewise be used in the practice of this invention. Such substituted butadienes are commercially available from, for example, Atlanta-Richfield under the trademark "Poly B-D", a series of hydroxy-terminated butadiene polymers; for example, use can be made of hydroxy-terminated butadiene homopolymers (e.g., Poly B-D R-15M which has a hydroxy number of 42 or Poly B-D R-45M).

In addition, use can be made, as the rubbery polymers, of elastomeric materials formed by copolymerization of one or more of the conjugated dienes described above with one or more ethylenic monomers such as styrene as well as hydroxy, amino and mercapto substituted derivatives thereof, acrylonitrile, methacrylonitrile, acrylic acid, methacrylic acid, etc. Included are butadiene-styrene rubbers, butadiene-acrylonitrile rubbers, etc. Hydroxy-terminated copolymers are likewise useful in the practice of this invention, including the hydroxy-terminated butadiene-styrene copolymer designated "Poly B-D CS-15" and hydroxy-terminated butadiene-acrylonitrile copolymers (e.g., Poly B-D CN-15 having a hydroxyl number of 39).

In carrying out the reaction of the asphalt with the vinyl aromatic monomers and the rubbery polymer, it has been found that no catalysts are required, although free radical catalysts may be used, if desired. It is sufficient that the mixture of the asphalt, vinyl aromatic monomer and the rubbery polymer be heated to a temperature ranging from 200°–500° F. to promote the reaction. As will be appreciated by those skilled in the art, the reaction time is somewhat dependent on the reaction temperature with higher temperatures favoring a more rapid rate of reaction. If desired, the asphalt can be, prior to reaction with the vinyl aromatic monomers and the rubbery polymer, dissolved in an inert organic solvent, preferably an aromatic solvent, although the use of the solvent is not necessary. It is generally preferred to carry out the reaction under non-oxidizing conditions to avoid combustion. Use of a vacuum or an inert gas can be made for that purpose.

The relative proportions of the vinyl aromatic monomer and the rubbery polymer are not critical and can be varied within relatively wide ranges. Best results are generally achieved when the vinyl aromatic monomer is employed in an amount corresponding to 0.5 to 35%, based on the weight of the asphalt and the rubbery polymer is used in an amount ranging from 0.5 to 30% by weight, based upon the weight of the asphalt.

In carrying out the reaction used to produce rubber modified asphalts of this invention, use can be made of ordinary asphalt or asphalt which has been modified by reaction with air (e.g., blown asphalt), steam, ammonia or organic amines as described in copending application Ser. No. 852,898, filed Nov. 8, 1977 and now U.S. Pat. No. 4,166,752.

It has been found that the interreaction of a vinyl aromatic monomer and the rubbery polymer with the asphalt produces a highly cross linked asphalt which is non-tacky at ordinary temperatures. The resulting asphalt, having improved compressive strength, can thus be used in a variety of applications. For example, the asphalt compositions of this invention are highly suitable for use in road paving applications, and particularly road paving applications wherein the asphalt is reinforced with glass, either in the form of glass fibers or in the form of glass frit. It is believed that the reaction of the vinyl aromatic compound and the rubbery polymer serves to impart to the asphalt reactive groups which are capable of establishing a chemical bond between the asphalt and glass used as reinforcement.

In addition, asphalt compositions of this invention can also be used in applications where asphalt is reinforced with a siliceous filler other than glass or in addition to glass, notably including siliceous aggregates.

In one preferred form of the invention, the asphalt compositions of this invention can be used in the treatment of glass fibers to improve the bonding relationship between the glass fibers and a wide variety of materials reinforced with glass. For example, the asphalt compositions of the invention can be applied as a thin coating to individual glass fiber filaments, or as an impregnant to bundles of glass fibers whereby the asphalt coating or impregnant serves to intertie the glass fiber surfaces with, for example, treated or untreated asphalt used in road paving applications. In this embodiment of the invention, the coated or impregnated glass fibers can advantageously be used as reinforcement for unmodified asphalt in road paving applications whereby the asphalt matrix of the road paving material is chemically bonded to the coating for the impregnant to the glass fibers. The asphalt forming the coating or impregnant, in turn, serves to intertie the chemically modified asphalt of this invention with the untreated asphalt, the latter forming a continuous phase in which the coated or impregnated glass fibers are distributed as reinforcement.

In the preferred practice of the invention, the chemically modified asphalt is employed in road paving applications, usually blended with glass fibers to provide reinforcement for the asphalt. The chemically modified asphalt is particularly well suited for use in the repair of asphalt pavement because the asphalt of the invention, at least partially by reason of its improved compressive strength as a result of chemical modification, has greater strength and compatibility with glass fibers as compared to untreated asphalt.

In addition, the asphalt-treated glass fibers of this invention can also be used as reinforcement for other materials, including, but not limited to, rubber in the manufacture of glass fiber-reinforced elastomeric products, such as tires, and plastics, as in the manufacture of glass fiber-reinforced plastics. Glass fibers treated with the chemically modified asphalt of this invention can be used in the repair of "potholes". In that application, glass fibers, preferably in the form of a woven roving, are embedded in a blend of asphalt and aggregate used to fill the pothole in roads to provide increased strength for the asphalt employed in filling the pothole. Glass fibers prepared in accordance with the practice of this invention can also be used in a like manner in the repair of cracks whereby the glass fibers with the asphalt coating thereon markedly increase the strength of such repairs, thereby assuring improved durability.

When used in the coating or impregnation of glass fibers or bundles of glass fibers, respectively, use can be made of asphalt compositions of this invention in amounts over relatively wide ranges. Generally, the coating or impregnant is applied in an amount sufficient to constitute from 0.1 to about 50% by weight, or even higher, of the weight of the glass fibers.

It has been found, in accordance with the practice of this invention that, when employing asphalt compositions of this invention to glass fibers, either as a thin film coating on the individual glass fiber filaments or as an impregnant in bundles of glass fibers, it is desirable to heat the asphalt after it has been applied to the glass fiber surfaces. That optional heat treatment step serves to set the asphalt coating on the glass fiber surfaces, and, at the same time, to insolubilize by further cross linking the asphalt thereon. The heating step has been found to increase the wet strength of the asphalt-treated glass fibers significantly.

In carrying out the optional heating step as described above, it is sufficient that the asphalt-treated glass fibers be heated to a temperature ranging from 200°–500° F., depending somewhat on the softening point of the asphalt involved.

Having described the basic concepts of the present invention, reference is now made to the following examples, which are provided by way of illustration and not by way of limitation, of the practice of this invention in the preparation of chemically modified asphalts and their use.

EXAMPLE 1

This example illustrates the chemical bonding of a butadiene-styrene rubber to asphalt using styrene as the vinyl aromatic linking monomer.

A paving grade asphalt (50/60 penetration at 77° F.) is formed into a hot melt, and thereafter butadiene-styrene rubber is blended therein in an amount corresponding to about 4% rubber based upon the weight of the asphalt. Thereafter, styrene in an amount of 12% by weight is blended with the mixture which is then heated to 325° F. for 24 hours while constantly mixing the material.

The result is a rubber-modified asphalt which, when cooled, is substantially free from tackiness and can be used in combination with conventionally-sized glass fibers in the patching of potholes in roads and the like.

EXAMPLE 2

The procedure of Example 1 is repeated using a butadiene polymer having a molecular weight of approximately 1500 and styrene as the vinyl aromatic monomer. Comparable results are obtained.

EXAMPLE 3

Using the procedure described in Example 1, a blown asphalt having an oxygen content of 0.78% by weight is reacted with styrene and a butadiene-acrylonitrile rubber.

The resulting rubber-modified asphalt is then applied as a coating to glass fibers to establish a secure bonding relationship between the rubber-modified asphalt and the glass fiber surfaces.

EXAMPLE 4

The procedure of Example 3 is repeated, except that the asphalt employed is an ammonia-modified asphalt having a nitrogen content of 1.28% by weight.

The butadiene-acrylonitrile rubber is thus chemically bonded to the asphalt with the styrene to produce a chemically modified asphalt substantially free of tack at ambient temperatures.

EXAMPLE 5

Using the procedure described in Example 1, 200 parts by weight of asphalt are placed into a pre-heated reactor, which is then evacuated. Thereafter, 8 parts by weight of a styrene-butadiene rubber and 30 parts by weight of styrene are added to the asphalt with agitation. The temperature of the reactor is then raised to about 320° F. and maintained at that level for 24 hours. A chemically modified asphalt having good compressive strength is obtained.

It will be understood that various changes and modifications can be made in the details of procedure, formulation and use without departing from the spirit of the invention, especially as defined in the following claims.

What is claimed is:

1. A chemically-modified asphalt composition comprising an asphalt which has been reacted with (1) a polymerizable vinyl aromatic monomer and (2) a rubbery polymer, the reaction having been carried out at a temperature at which the vinyl aromatic monomer and the rubbery polymer react with the asphalt.

2. A chemically-modified asphalt as defined in claim 1 wherein the rubbery polymer is selected from the group consisting of homopolymers of a conjugated diene and copolymers formed of a conjugated diene and at least one ethylenic monomer copolymerizable therewith.

3. A chemically-modified asphalt as defined in claim 2 wherein the ethylenic monomer is selected from the group consisting of styrene, acrylonitrile, methacrylonitrile, acrylic acid, methacrylic acid, hydroxystyrene, aminostyrene and mercaptostyrene.

4. A chemically-modified asphalt as defined in claim 1 wherein the asphalt reacted with the vinyl aromatic monomer and the rubbery polymer is an asphalt which has been pre-reacted with a modifying agent selected from the group consisting of steam, an oxygen-containing gas, ammonia and organic amines.

5. A chemically-modified asphalt as defined in claim 1 wherein the vinyl aromatic monomer is reacted in an amount within the range of 0.5 to 35% based upon the weight of the asphalt.

6. A chemically-modified asphalt as defined in claim 1 wherein the rubbery polymer is reacted in an amount ranging from 0.5 to 30% by weight based on the weight of the asphalt.

7. A chemically-modified asphalt as defined in claim 1 wherein the vinyl aromatic monomer is styrene.

8. Glass fibers having a coating thereon, said coating comprising a chemically modified asphalt as defined in claim 1.

9. Glass fibers as defined in claim 8 wherein the glass fibers are in the form of a bundle and the coating constitutes an impregnant in the bundle.

10. In a glass fiber reinforced asphalt wherein an asphalt constitutes a continuous phase in which the glass fibers are distributed as reinforcement, the improvement comprising, as the continuous phase, a chemically-modified asphalt as defined in claim 1.

11. In a glass fiber reinforced asphalt wherein an asphalt constitutes a continuous phase in which glass fibers, having a coating thereon, are distributed through the continuous phase as reinforcement, the improvement comprising glass fibers which have been coated with a chemically-modified asphalt as defined in claim 1.

12. A chemically-modified asphalt composition comprising an asphalt which has been reacted with (1) a polymerizable vinyl aromatic monomer and (2) a rubbery polymer in the form of a butadiene-styrene rubber, the reaction having been carried out at a temperature within the range of 200°–500° F.

* * * * *

UNITED STATES PATENT AND TRADEMARK OFFICE
CERTIFICATE OF CORRECTION

PATENT NO. : 4,273,685
DATED : June 16, 1981
INVENTOR(S) : Alfred Marzocchi, Michael G. Roberts, Charles E. Bolen It is certified that error appears in the above—identified patent and that said Letters Patent is hereby corrected as shown below:

At Item [75], Inventors, the name of "Edward R. Harrington, Jr." should be deleted.

At column 4, line 5, the word "for" should be changed to "or".

*Signed and Sealed this*

*Twentieth* Day of *April 1982*

[SEAL]

*Attest:*

GERALD J. MOSSINGHOFF

*Attesting Officer*     *Commissioner of Patents and Trademarks*